Jan. 1, 1957  M. ALDEN  2,776,183
RECORDER
Filed June 14, 1950  6 Sheets-Sheet 1

Inventor
Milton Alden
by Roberts, Cushman & Grover
Attys

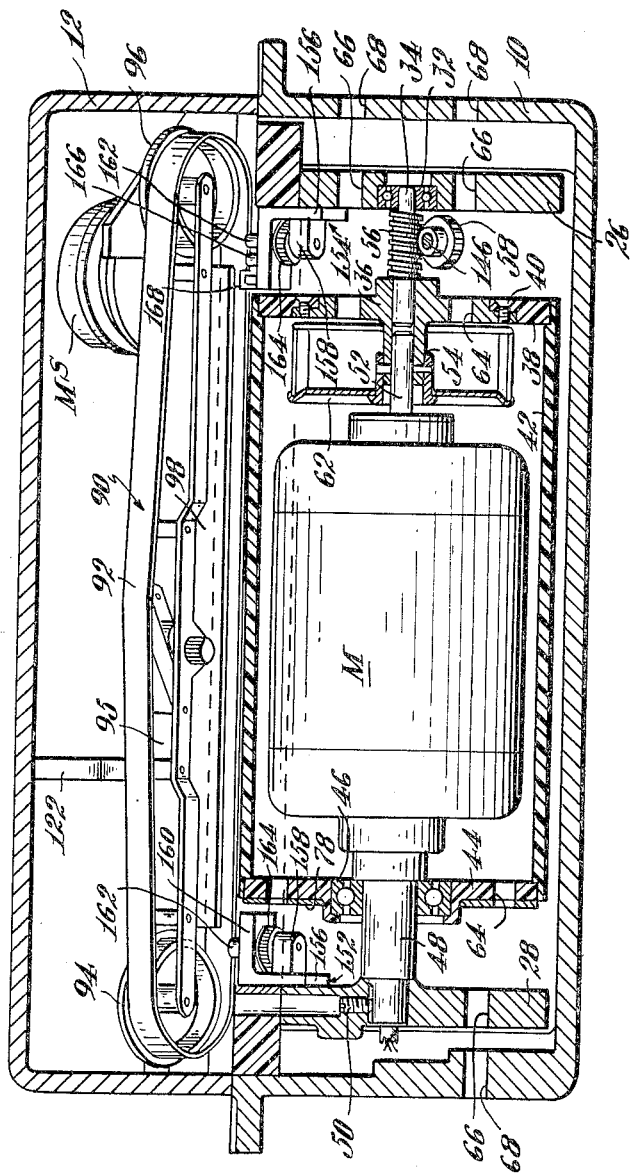

Jan. 1, 1957 M. ALDEN 2,776,183
RECORDER
Filed June 14, 1950 6 Sheets-Sheet 3

Inventor
Milton Alden
by Roberts, Cushman & Grover
Attys

Jan. 1, 1957 M. ALDEN 2,776,183
RECORDER
Filed June 14, 1950 6 Sheets-Sheet 4
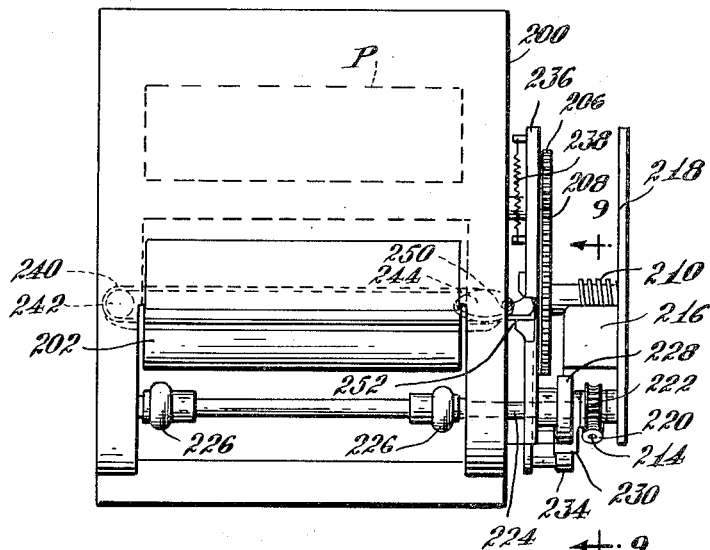
Fig. 8
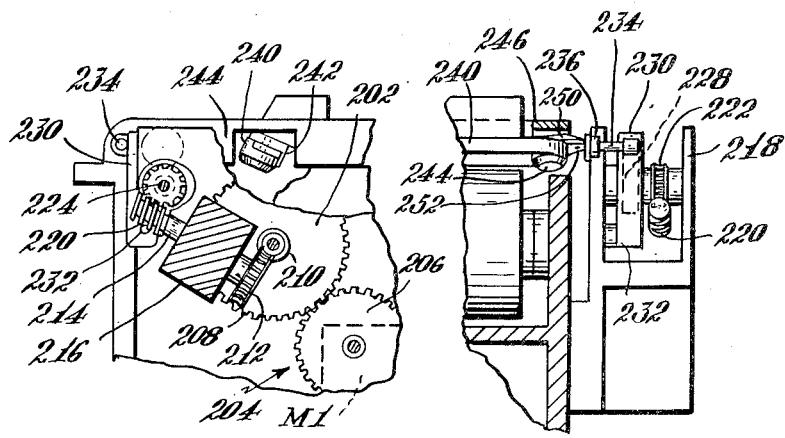
Fig. 9
Fig. 10
Inventor
Milton Alden
by Roberts, Cushman & Grover
Attys Jan. 1, 1957   M. ALDEN   2,776,183
RECORDER
Filed June 14, 1950   6 Sheets-Sheet 5

Inventor
Milton Alden
by Roberts, Cushman & Grover
att'ys.

Jan. 1, 1957
M. ALDEN
2,776,183
RECORDER
Filed June 14, 1950
6 Sheets-Sheet 6
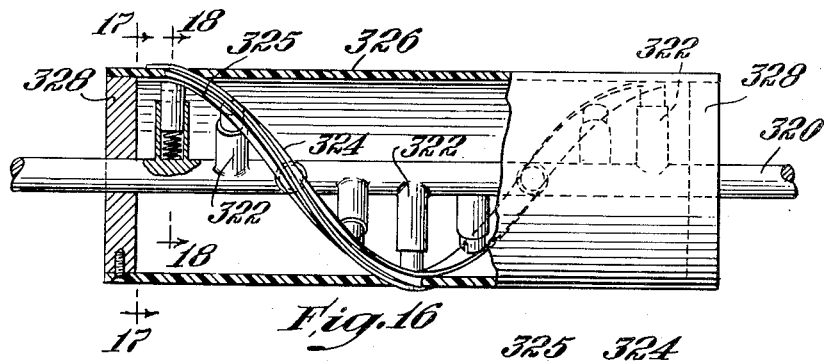
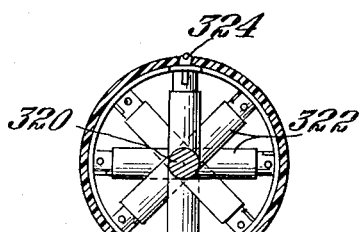
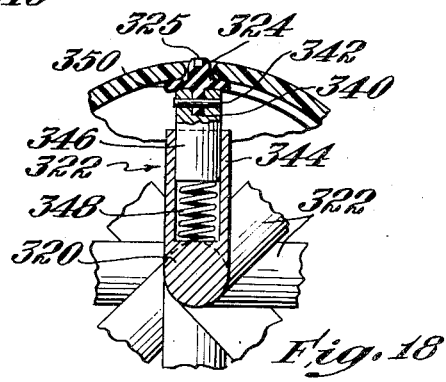
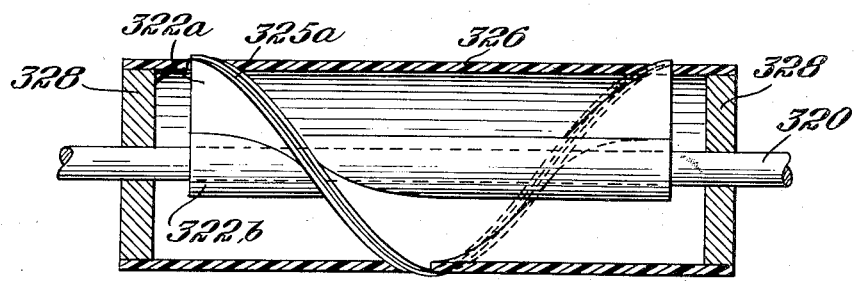
Inventor
Milton Alden
by Roberts, Cushman & Grover
Attys.

United States Patent Office 2,776,183
Patented Jan. 1, 1957

2,776,183

RECORDER

Milton Alden, Wellesley, Mass.

Application June 14, 1950, Serial No. 167,980

8 Claims. (Cl. 346—101)

This invention relates to recorders and more particularly to recorders of the type shown in my copending application Serial No. 149,182, filed March 11, 1950, of which the present application is a continuation-in-part, wherein a sheet or web of electrosensitive paper is fed between two recording elements or electrodes which are moved relatively to each other to trace successive lines transversely of the direction in which the paper is fed.

As stated in the copending application, there are several ways in which the electrodes can be arranged to obtain such a trace, one common way being to position an elongated electrode with its straight effective recording edge transversely of the direction of feed of the paper web. The other electrode is provided with a recording edge arranged as a helix for example upon the periphery of a drum whose axis is maintained in parallel relationship to the paper web as the web is fed between the electrodes and in a plane passing through the effective recording edge of the stationary electrode. Relative movement between the electrodes is effected by rotating the drum about its axis.

Ideally the paper web should be maintained flat and without transverse movement to the plane thereof so that with the contact pressure of the electrodes reduced to a uniform minimum pressure value will result which will permit the flow of a sufficient current to cause an electrolytic action to take place in the paper thus minimizing the scuffing and abrasion of the moist fibers of the paper and resulting in better definition density in the record. These ideal conditions are not realized in present recorders of conventional design wherein a yieldably mounted blade electrode is urged towards a substantially rigidly journaled helical electrode because of the change in effective lever arm as the point of contact between the helical and straight electrodes and because of the tolerances to which it is economically feasible to manufacture the drum and journaling parts. Erosion and wear of the blade electrode cause its effective recording edge to develop irregularities which exceed the thickness of the recording paper. Because of its inertia the blade electrode is not able to follow such irregularities causing poor definition and a lack of uniformity of density in the record. Similar defects result from "bouncing" of the electrodes in recorders of the type wherein the helical conductor makes less than a full turn upon the drum.

Objects of this invention are to provide a recorder which will operate at high speeds, which improves the definition of the record, which reduces electrode wear to a minimum, which minimizes scuffing and abrasion of the recording paper, which improves the definition and density of the record, which compensates for irregularities in the recording elements, which reduces vibration, which compensates for misalignment and unbalance of the rotating elements, which reduces "bouncing" of the electrodes, and which advances the recording art generally.

In a broad aspect the invention contemplates a recording element which comprises a helically disposed strip of conducting material which is rotated by driving means about the axis of the helix formed by the conducting strip, resilient means being interposed between the strip and the driving means to permit displacement therebetween.

In another aspect the interposed resilient means comprises an elongated strip or ribbon of resilient material, such as rubber which may be either solid or tubular in section, disposed about the periphery of a cylinder or drum as the single turn of a helix. Such tube or strip can be molded integrally with the drum or be cemented, clipped or otherwise secured to the periphery thereof, but is preferably inserted in a slot cut or otherwise formed in the outer surface of the drum. A conducting element is secured to the resilient member by clips or cementing or is molded therein, in any case the effective recording edge or portion of the conductor is raised slightly above the adjacent outer surface of the strip.

In a specific aspect the resilient member comprises a hollow tube for example of rubber or other material having similar resilient and elastic properties. The tube is restrained in a shouldered slot or recess in the periphery of the drum so that the cross section thereof is essentially oval or elliptical. By proper proportioning of the walls and dimensions of the tube it is possible to obtain a total contact pressure resulting from both the elastic force of the tube and the centrifugal force due to rotation of the drum which will not exceed a force of 8 oz. upon an area of contact between the electrodes of 0.0001 square inch. Furthermore because of the comparatively low mass and shape of the tube such contact pressure is substantially independent of the deflection of the tube over a relatively large range so that the pressure exerted does not change because of tipping of the blade as the point of contact with the helix shifts or because of unbalance in the drum.

In another specific aspect the recording element comprises a drum of resilient material having a strip of conducting material secured to the outer surface thereof in the form of a helix. The drum is surrounded by a rigid sleeve which has a helically disposed slot therein so that the portion of the drum carrying the conductor protrudes beyond the portions of the sleeve adjacent the slot when a gaseous fluid such as air or other gas is introduced under pressure into the interior of the drum. Such fluid can alternatively be in the form of a liquid whereby the rotation of the drum results in a centrifugal force being developed by the liquid which is exerted upon the periphery of the drum causing it to forceably contact the interior surface of the sleeve so that the drum portion adjacent the slot protrudes therethrough.

In a further specific aspect the helically slotted sleeve surrounds a drum of a reticulated material such as silk or nylon carrying a supply of an electrically conducting liquid which seeps through the interstices of the drum to form a conducting path having the shape of the helical slot in the surrounding sleeve. It is also possible to supply the ions to the particular paper being used to cause the chemical change resulting in the record by employing, as a liquid in the drum, an electrolyte having such ions.

These and other objects and aspects will be apparent from the following description of specific embodiments of the invention which refer to accompanying drawings wherein Fig. 1 is a plan view of one embodiment of the invention with the cover removed;

Fig. 2 is a sectional view on line 2—2 of Fig. 1;

Fig. 8 is a plan view of a second embodiment of the invention;

Fig. 9 is a section on line 9—9 of Fig. 8;

Fig. 10 is an elevation view with parts broken away of the embodiment shown in Fig. 8;

Fig. 16 is a side elevational view in partial section of a fourth type of recording element;

Fig. 17 is a sectional view on line 17—17 of Fig. 16;

Fig. 18 is an enlarged fragmentary sectional view on line 18—18 of Fig. 16;

Fig. 19 is an axial sectional view of a fifth type of recording element; and

Figure 1:
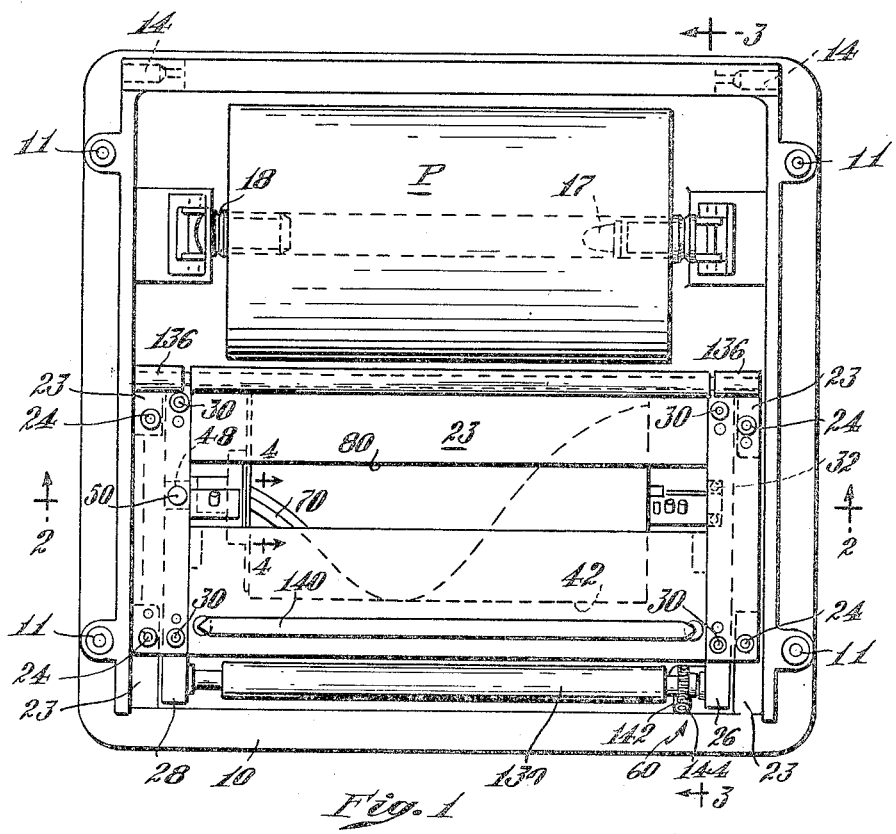
Figure 3:
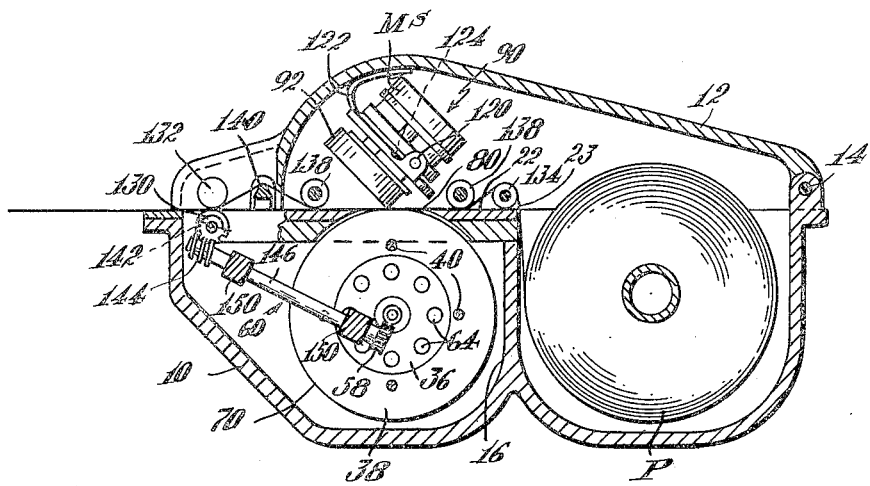
Fig. 3 is a sectional view on line 3—3 of Fig. 1.

Referring to Figs. 1 through 3, the first embodiment of the invention chosen for purposes of illustration comprises a recorder having a flanged housing or casing 10 preferably cast and having a cover 12 attached thereto by means of hinges 14. Leveling screws 11 are provided in the casing flange for mounting the recorder upon a supporting structure (not shown). The casing 10 is divided into two compartments by means of a vertical wall or baffle 16. In one of these compartments is a roll of electrosensitive recording paper P wound upon a spool or bobbin which is preferably supported by means of a shaft 17 (Fig. 1) and pivot 18 similar to those shown in my copending application Serial No. 138,673, filed January 14, 1950.

The second compartment houses a recording element designated generally as 20 (Fig. 2). To this end the top of such compartment is closed by a plate 22 on the top of which is a platen 23 of insulating material over which the web of the recording paper P is drawn from the roll as will be described hereinafter. The plate 22 is supported upon four bosses 23 (Fig. 1) located respectively in the four corners of the compartment, the plate being secured to the top of the bosses by means of cap screws 24. Depending from the bottom surface of the plate 22 in spaced relationship are two brackets 26 and 28 (Fig. 2). Interconnection between the brackets and the plate 22 is made by means of cap screws 30 (Fig. 1) which pass through the plate threadingly to engage the respective brackets.

The bracket 26 is provided with a recess wherein is held the outer race of a ball bearing 32 (Fig. 2). The inner race of the bearing carries one end of a stub shaft 34, the other end of which engages the aperture in the hub of a spider 36. Arranged circumjacent the spider 36 is an annular ring 38 of an insulating material such as a suitable plastic, the ring and spider being attached to each other by means of a lap joint secured by flat headed screws 40 so that the ring and spider form one head for a cylinder 42 which together with an opposite head 44 comprises the drum assembly of the recording element 20. The head 44 is of a non-conducting material and is provided with a recessed hub wherein is carried the outer race of a ball bearing 46. The inner race of the bearing 46 engages a hollow stub shaft or finger 48 one end of which is attached to the frame of an electric motor M. The opposite end of the finger 48 is reduced in diameter so that it engages an aperture in the bracket 28. Relative movement between the finger 48 and the bracket 28 is prevented by a set screw 50 which engages threads at the bottom of an aperture in the bracket so that the end of the screw is brought into contact with a flat upon the end of the finger. The rotatable shaft 52 of the motor M projects into the aperture in the spider hub 36, relative rotation therebetween being prevented by means of a pin 54. From the above it will be apparent that the energization of the motor M from a power source (not shown) by leads extending out through the hollow finger 48 will result in the rotation of the recording element 20 in the bearings 32 and 46.

The motor M is also used to operate the paper feed mechanism. To this end a worm 56 is secured to or cut integrally upon the portion of the stub shaft 34 between the bearing bracket 26 and the spider hub 36 which worm engages a gear 58 to form a part of a speed reduction unit 60 (Fig. 3) described in detail hereinafter. To prevent overheating of the motor M, a fan 62 (Fig. 2) is secured to the spider hub 36 by means of the pin 54 which also couples the hub to the shaft 52 of the motor M as described heretofore. Rotation of fan 62, as the motor M operates, circulates air through the apertures 64 in the cylinder heads 44 thereby to ventilate the interior of the cylinder 42. Additional breather apertures 66 and 68 are incorporated respectively in the brackets 26 and 28 and in the side walls of the casing 10.

Figure 7:
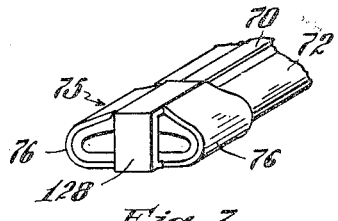
Fig. 7 is a fragmentary view showing the means for securing the end of the conducting helix to the resilient member.

The effective conducting portion of the recording element comprises a strip or ribbon 70 of conducting material, for example stainless steel, molded in a resilient member such as the hollow tube 72. The portions of the outer surface of the resilient tube 72 adjacent the conducting strip 70 are built up as shoulders on either side thereof so that no sharp or feather edges protrude to scrape or scuff the recording paper. It has been found possible to cement the resilent tube 72 to the outer surface of the cylinder 42; but a preferable arrangement is to provide a slot 71 in the periphery of the cylinder 42 arranged as a single turn of a helix wherein the tube is inserted, the tube being maintained therein by opposed lips or shoulders 74 and a clip 75 (Fig. 7) at each of the respective ends thereof.

Each of the clips 75 have two oppositely disposed tabs 76 which are bent around the resilient member 72 and a tongue 78 bent down and under the end of the member 72 so that the tongue comes into electrical contact with an annular disc 78 (Fig. 2) of conducting material attached to the outer surface of the head 44 which acts as a slip ring whereby one terminal of an input signal source (not shown) is connected to the conducting strip by means of a brush or other conventional sliding member (not shown) which makes electrical contact with the disc.

Figure 4:
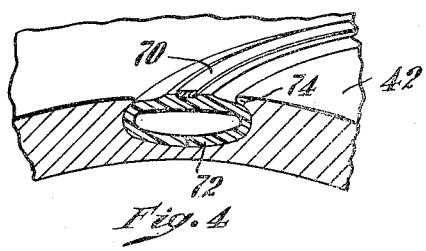
Fig. 4 is an enlarged fragmentary view on line 4—4 of Fig. 1.

For high speed operation the tubular resilient member 72 is preferable because as can be seen from Fig. 4 the free portion adjacent the electrode 70 is flexibly hinged to the tube within the slot 71 so that its low inertia permits following of the surface of the paper, and so that the shoulder 74 bearing on the free portion of the tube between the hinge and the electrode greatly reduces fluttering and bouncing as the drum assembly rotates. Another advantage of tubular construction of the resilient member, is that the restoring force exerted thereby varies only slightly over comparatively large displacements of the conducting strip 70. For lower speed operation where the above factors are of less importance, other resilient members having different cross sections have been found to be satisfactory, for example the hollow trapezoidal member 72a (Fig. 5) and the solid trapezoidal member 72b of Fig. 6, the restoring force being limited by the confining effect of the shoulders 74 which face inwardly and limit outward distension of the resilient member 72.

The brackets 26 and 28 are proportioned with respect to the diameter of the cylinder 20 so that the cylinder projects through a transverse slot 80 (Fig. 1) in the platen 23 with its surface substantially tangent to the plane of the upper surface of the plate thus bringing the conductor 70 into contact with the web of recording paper P.

The second recording element has an effective recording edge disposed as a straight edge transversely to the direction in which the paper web is fed and in a vertical plane passing through the axis of rotation of the drum assembly. Such element may be any of the conventional types of stationary blades such as are commonly used in the art, but I prefer to use a recording element assembly 90 similar to that described in detail in my copending application Serial No. 149,182, filed March 11, 1950, the effective portion of which is a thin strip or blade 92 of flexible conducting material, such as stainless steel, whose ends are joined, for example by means of butt welding, to form a continuous loop. This loop is extended between two spaced rolls or pulleys 94 and 96 which are journaled in bearings at the respective ends of a supporting frame 95. The pulley 94 is an idler rotatably secured to the end of the frame 95. The second pulley 96 is continuously driven by a very low speed motor Ms which is mounted upon the top of the frame 95 so that the blade 92 is moved around the pulleys 94 and 96 at a rate to compensate for wear and erosion. As the blade 92 is moved, the portion thereof whose lower edge forms the effective recording edge slides along a flat elongated portion 98 of the frame 95. Upward movement of the blade 92 is restrained by flanges 102 upon the pulleys 94 and 96.

The recording element 90 is pivotally suspended from the cover 12 by means of two apertured tabs or ears 120 (Fig. 3) located respectively at opposite ends of the frame 95. The above mentioned pivotal connections between the recording element 90 and the cover 12 are located so that when the cover 12 is in the closed position, as is shown in Fig. 3, the lower effective recording edge of the blade 92 is in contact with the web of the recording paper P in a vertical plane through the axis of rotation of the drum assembly as described heretofore. The plane of the effective portion of the blade 92 preferably is arranged as is shown in Fig. 3 so that such plane makes an acute angle of approximately 60 degrees with the plane of the paper web thereby reducing scuffing and abrasion of the paper. Such angular mounting has the additional advantage of permitting the inherent flexibility of the blade 92 to accommodate misalignment and unbalance in the drum assembly, an important consideration in high speed operation.

The recording element 90 is brought into contact under pressure with the paper web by the force exerted by a bent leaf spring 122, one end of which is secured to the frame 95 by means of screws 124. The opposite end of the spring is attached to the cover in a similar manner as is shown in Fig. 3.

Fig. 3 also illustrates the path of the web of electrosensitive paper P through the recorder. As the web is unrolled from the bobbin by feed rolls 130 and 132, it passes over an idler roll 134 journaled in two bearing brackets 136 (Fig. 1), thence under two idler rolls 138 journaled in the cover in spaced relationship so that the web is held against the platen 22, thence over the apex of a smoothing bar 140 having a substantially triangular cross section, and thence through the feed rolls 130 and 132. The top rolls 132 are idlers which are journaled upon arms extending from the cover 12. The associated driven roll 130 is journaled in the brackets 26 and 28 and is provided with a gear 142. Meshing with the gear 142 is a worm 144 carried upon a shaft 146, the other end of which carries the above mentioned gear 58 of the speed reduction unit 60. The shaft 146 is journaled in bearing brackets 150 projecting from the side of the casing 10.

When the cover 12 is closed as in shown in Fig. 3, the relationship of the effective edge of the recording strip 92 is determined by two stop assemblies 152 and 154 (Fig. 2) supported near the top of the inner surfaces of the brackets 28 and 26. The assembly 152 comprises an L-shaped bracket, one leg 156 of which is secured to the side of the bracket 28. A tab 158 projects normally from the leg 156 parallel to the second leg 160 so that a slot is formed therebetween. A hardened stop pin 162 engages threaded aligned apertures in the arm 160 and the tab 158 so that the upper end thereof can be brought into contact with the lower effective recording edge of the strip 92. The pin 162 is locked in adjusted position by means of a knurled circular nut 164 which is located in the slot formed between the tab 158 and the arm 160.

Figure 20:
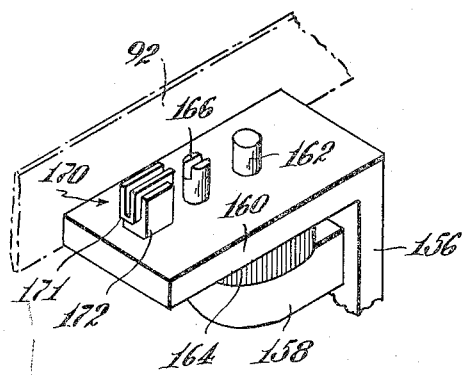
Fig. 20 is a fragmentary isometric view of the blade reconditioning device and the adjustable stop for the blade.

As is shown in Fig. 20, the stop assembly 154 is similar in construction to the assembly 152 described above but has projecting from the top of the arm 160, in addition to the stop pin 162, blade reconditioning means including a hone 166 and a wiper 120. The hone 166 consists of a block of abrasive material having a slot in the top thereof through which the blade 92 is moved by the motor Ms so that burrs and irregularities are removed thereby. The wiper 170 comprises a piece of leather 171 or similar material folded and held in a spring clip 172 so that the blade 92 passes between the folds.

It is also possible to move the blade electrode in other ways than the motor M described heretofore. For example the recorder shown in Figs. 8 through 10 employs a "hitch" feed for the blade whereby the blade is moved in successive steps rather than continuously. As is shown in Fig. 8, this recorder is generally similar to the recorder described in detail heretofore, having a casing 200 wherein is housed a roll of recording paper P and a drum 202 with a helical conductor superimposed upon its outer periphery for example by means of a resilient member in a manner similar to that described heretofore in connection with the cylinder 42. As is shown in Fig. 9, the drum driving motor M1 is located outside of the drum 202 and is coupled thereto by means of a speed reducing unit 204 comprising the meshing gears 206 and 208 which are attached to the shafts of the motor and drum respectively. The drum shaft also carries a worm 210 which engages a gear 212 secured to one end of a short shaft 214 journaled in a bracket 216. The bracket 216 is in turn carried by a plate 218 which is attached to the side of the casing 200. The opposite end of the shaft 214 carries a second worm 220 engaging a gear 222 upon a shaft 224 whereon are mounted two paper feed rolls 226 (Fig. 8).

The shaft 224 also carries a cam 228 which is in contact with a cam follower 230 pivotally connected at its lower end to the side of the casing 200 as at 232. The upper end of the follower 232 is in contact with an arm 234 extending normally from a slidable member 236 carried in a groove in the top of the side of the casing 200. The member 236 is biased by means of a spring 238 so that the arm 234 is maintained in contact with the cam follower 230.

The movable blade 240 is again made in the form of a loop extending between two pulleys 242 and 244 journaled at the respective ends of a frame 246. In this instance both pulleys are idlers and the blade 240 fits rather loosely about the pulleys. The driving motor is also dispensed with, the power for moving the blade 240 being obtained from the drum motor M1 as will be described below.

Figure 13:
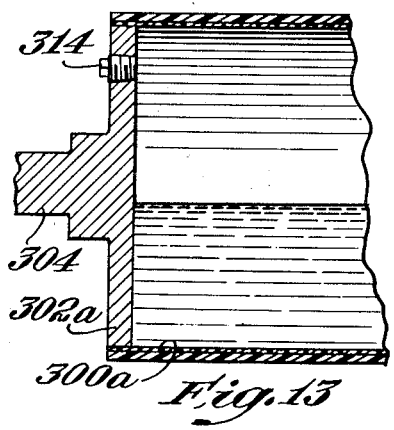
Fig. 13 is an axial sectional view of a third type of recording element.

Pivotally mounted upon the same shaft as the pulley 244 is an arm 250 which in turn has a dog 252 pivotally mounted upon its projecting end. One end of the dog 252 engages a slot in the slidable member 236 as is shown in Fig. 13. The opposite end of the dog 252 has a cammed surface so that as the slidable member 236 is moved towards the front of the recorder by the cam, the dog pivots thus wedging the blade 92 between the cammed surface of the dog and the pulley 244. Both the dog 252 and the arm 254 then pivot about the pulley shaft so that the tape is moved about the pulleys. Upon the return movement of the slidable member 236 by the spring 238, the dog 252 releases, any reverse movement of the blade 240 during such release being more than overcome by the blade movement in the opposite direction so that the net movement advances the blade in a series of steps.

Figure 5:
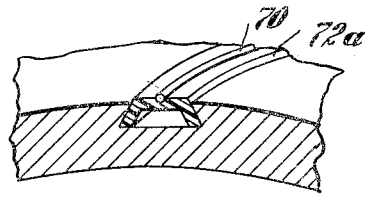
Fig. 5 is a view similar to Fig. 4 showing an alternative construction.
Figure 6:
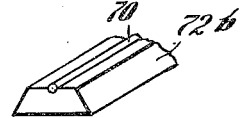
Fig. 6 is a fragmentary view of one type of resilient mounting for the conducting helix.

With the drum driving motor located without the recording drum assembly as illustrated in the above described "hitch" feed recorder, it is possible to employ resilient members for supporting the effecting recording conductor other than the strips 70, 70a, 70b of elastic material such as are illustrated in Figs. 4 to 6 and described in detail in connection with the first embodiment of the invention.

Figure 11:
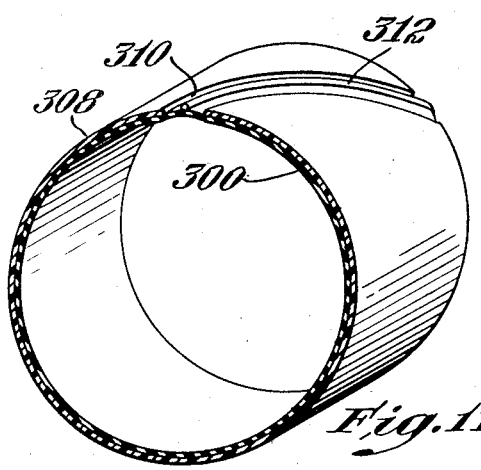
Fig. 11 is a sectional isometric view of an alternative type of recording element.
Figure 12:
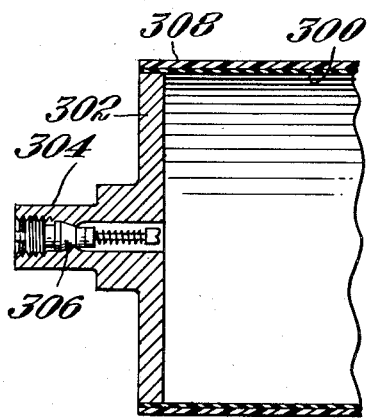
Fig. 12 is an axial sectional view of the element shown in Fig. 11.

The first of the alternative construction of recording element is shown in Figs. 11 and 12 which element comprises a hollow drum or cylinder 300 of a resilient material, such as natural or synthetic rubber, whose ends are closed by heads 302. The hub of each head 302 is reduced in diameter as at 304 so that it may be pressed into the inner race of a ball bearing (not shown) or be used as the bearing surface when the drum is journaled in sleeve bearings. One of the hubs has an axially disposed aperture therethrough as is shown in Fig. 12 wherein is installed a check valve 306, for example one similar to that used to maintain the air in an inner tube of an automobile tire.

Arranged circumjacent the cylinder 300 is a rigid sleeve 308 made of a nonconducting material such as a suitable plastic. A slot 310 is cut in the outer surface of the cylinder in the form of a helix whereby the introduction of air or other gas under pressure into the interior of the drum by means of the valve 306 causes the resilient cylinder 300 to bulge through the slot so that it protrudes beyond the adjacent portions of the sleeve 308.

A strip of conducting material is secured to the protruding portion of the cylinder 300. In Fig. 11 this strip is shown as a wire 312 cemented to the cylinder, but it is to be understood that other types of conducting material can be used, for example that obtained by spraying the protruding portion of the cylinder 300 with metal, or making the cylinder of a conducting synthetic rubber. It is also possible to use a liquid such as water rather than a gas under pressure as the fluid in the drum. When liquid is used, the centrifugal force resulting from the rotation of the drum forces the cylinder 300 against the sleeve 308 so that it protrudes through the slot 310.

Figure 14:
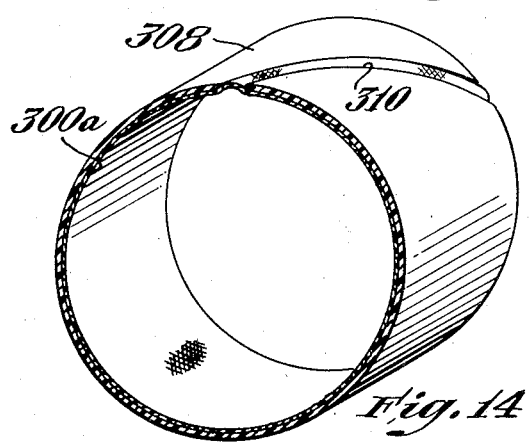
Fig. 14 is a sectional isometric view of the element shown in Fig. 13.

In Figs. 13 and 14 is shown an alternative recording element which is generally similar to those described above, the slotted sleeve 308 being identical with the sleeve shown in Figs. 11 and 12 and described above. The drum assembly is changed comprising in this instance a cylinder 300a of a reticulated material having a close mesh such as fine silk or nylon. The ends of the cylinder are closed by heads 302a of a nonconducting material having bearing surfaces 304 and which are similar to the heads 302 described above. The valve 306 is eliminated and a filler plug 314 substituted so that a liquid which is an electrolyte can be introduced into the interior of the drum. As the drum is rotated the liquid not only forces the cylinder 300a against the sleeve wall so that it protrudes through the slot 310 as described heretofore; but also seeps through the mesh thereby to form a conducting path.

Figure 15:
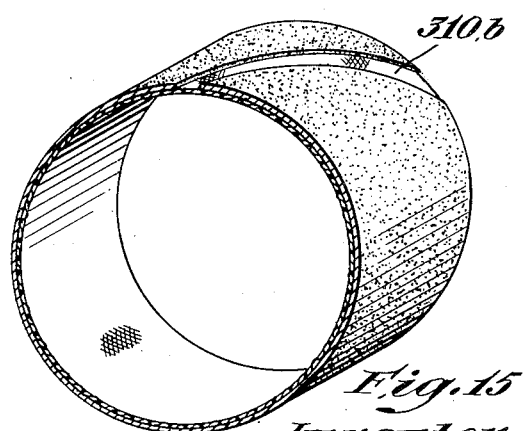
Fig. 15 is a sectional isometric view of a modification of the element shown in Figs. 13 and 14.

An alternative construction is shown in Fig. 15 which incorporates a drum 300b of a reticulated material which is similar in construction and journaled in the same manner as the drum assembly shown in Figs. 13 and 14. A coat of insulating material 308b is applied to the outer surface of the drum thereby acting both to impart rigidity to the drum surface and to prevent the leakage of fluid therethrough. A helical path 310b, which is left uncoated so that the electrolyte can seep through, provides the conducting surface.

It is also possible to support the helical conductor by resilient means which are not carried by the drum structure. For example, the recording element shown in Figs. 16 through 18 comprises a shaft 320 having radially projecting therefrom a plurality of spokes 322 at whose outer ends is carried a strip 324. The strip 324 shown in Fig 18 is of a nonconducting material having a conductor 325 molded in the top thereof although it is to be understood that the strip may be made of metal and the separate conductor as such eliminated. The spokes 322 are arranged about the shaft 320 so that the strip 324 makes one helical turn thereby to protrude out between lips forming a helical slot in the periphery of a cylinder 326 of rigid insulating material. The ends of the cylinder 326 are closed to form a drum by heads 328 which are supported upon the shaft 320.

As is best shown in Fig. 18, the strip 324 is attached to the ends of the spokes 322 by tabs 340 each of which tabs is pivotally held in a slot in the end of a respective tab by means of a pin 342. To permit deflection of the strip 324 each of the spokes 322 is in the form of a snubber or shock absorber comprising outer and inner telescoping members 344 and 346. The inner member 346 is biased outwardly by a spring 348, its travel being limited by a flange 350 extending from the strip 324 which flange contacts the inner surface of the cylinder 326.

The spokes 322 need not be mechanical snubbers but can be made of rubber or other resilient material having similar physical properties. Nor is it necessary that the spokes be separated, it being possible to incorporate the supporting members as a unitary structure, as is shown in Fig. 19 where a conductor 325a is supported by the outer edge of a helicoid molded of a resilient material, such as rubber, about a hub 322b which has an aperture for the shaft 320. The cylinder 326 and the heads 328 are similar to those described in detail in connection with the embodiment shown in Figs. 16 through 18.

It should be understood that the present disclosure is for the purpose of illustration only and that this invention includes all modifications and equivalents which fall within the scope of the appended claims.

I claim:

1. Apparatus for recording on a web comprising a support, a moving scanning member mounted on said support, a scanning element resiliently supported on said member, an elongate electrode having an effective edge cooperating with said element to record on said web, mounting means including yielding means floatingly carrying said electrode on said support so that the effective recording edge of said electrode is yieldingly urged toward said scanning element to press the web between said edge and said resiliently mounted element, stop means mounted stationarily on said support and positioned to engage the effective edge of said electrode and positively determine the spacing of said electrode edge from said scanning member, thereby to determine the pressure with which said resiliently mounted element presses said web against said electrode edge, and drive means for feeding said elongate electrode lengthwise so as to distribute erosion of said effective edge evenly along its length, whereby said spacing and the pressure on said web determined by engagement of said stop means with effective edge is maintained substantially constant despite erosion of said edge.

2. Apparatus for recording on a web comprising a support, a moving scanning member mounted on said support, a scanning element resiliently supported on said member, a loop electrode having an effective edge cooperating with said element to record on said web, mounting means including yielding means floatingly carrying said electrode on said support so that the effective recording edge of said electrode is yieldingly urged toward said scanning element to press the web between said edge and said resiliently mounted element, stop means fixed relatively to said support and positioned to engage the effective edge of said electrode and positively determine the spacing of said electrode edge from said scanning member, thereby to determine the pressure with which said resiliently mounted element presses said web against said electrode edge, and drive means for orbiting said loop electrode so that said effective edge is evenly eroded throughout its length, whereby said spacing and the pressure on said web determined by engagement of said stop means with said effective edge is maintained substantially constant despite erosion of said edge.

3. Apparatus for recording on a web comprising a base, a moving scanning member mounted on said frame and having a resiliently supported scanning element, a support hinged to said base to swing between open and closed positions relative to the base, a loop electrode having an effective recording edge, means mounting said loop electrode on said support to swing with said support toward said scanning element, said mounting means including yielding means floatingly carrying said electrode on said support so that the effective recording edge of said electrode is yieldingly urged toward said scanning element when said support is in closed position to press the web between said edge and said resiliently mounted element, stop means fixed relatively to said base and positioned to engage the effective edge of said electrode and positively determine the spacing of said electrode edge from said scanning member, thereby to determine the pressure with which said resiliently mounted element presses said web against said electrode edge, and drive means for orbiting said loop electrode so that erosion of said effective edge is evenly distributed throughout its length, whereby said spacing and said pressure determined by engagement of said stop means with said effective edge is maintained substantially constant despite erosion of said edge.

4. Apparatus for recording signals on a web comprising means for feeding the web lengthwise, an elongate recording element extending transversely of the web for engaging one side of the web, a scanning element opposed to said elongate element and effectively movable lengthwise thereof for marking signals on the web, means for moving said scanning element including means resiliently mounting said scanning element yieldingly to urge the same toward said elongate element and press the web between said elements, said mounting means including a free portion directly mounting the scanning element and resiliently hinged to said means at a point spaced from said scanning element, and an abutment on said moving means opposed to said free portion thereby to limit the pressure of said scanning element on the web.

5. Apparatus for recording signals on a web comprising means for feeding the web lengthwise, an elongate recording element extending transversely of the web for engaging one side of the web, a scanning element opposed to said elongate element and effectively movable lengthwise thereof for marking signals on the web, means for moving said scanning element including a drum having a recess extending around the drum, and resilient means extending out of the recess and distensible radially of the drum, said resilient means including a free portion directly supporting said scanning element and resiliently hinged to said means at a point spaced from said scanning element yieldingly to urge the same toward said elongate element and press the web between said elements, and an abutment on said moving means opposed to said free portion thereby to limit the pressure of said scanning element on the web.

6. Apparatus for recording signals on a web comprising means for feeding the web lengthwise, an elongate recording element extending transversely of the web for engaging one side of the web, a scanning element opposed to said elongate element and effectively movable legnthwise thereof for marking signals on the web, means for moving said scanning element including a drum having a recess extending around the drum and a hollow tube of resilient material extending out of the recess for supporting said scanning element yieldingly to urge the same toward said elongate element and press the web between said elements, and said recess having an inwardly facing shoulder partially overlying said tube so as to limit distension of the resilient tube out of the slot thereby to limit pressure of the scanning element on the web.

7. Apparatus for recording signals on a web comprising means for feeding the web lengthwise, an elongate recording element extending transversely of the web and having an effective edge engaging one side of the web, means yieldingly supporting said elongate element, a scanning element opposed to said elongate element and effectively movable lengthwise thereof for marking signals on the web, means for moving said scanning element including means resiliently mounting said scanning element yieldingly to urge the same toward said elongate element and press the web between said elements, said mounting means including a free portion directly mounting the scanning element and resiliently hinged to said means at a point spaced from said scanning element, and an abutment on said moving means opposed to said free portion thereby to limit the pressure of the scanning element on the web, and positioning means engaging the effective edge of said elongate element positively to locate it relative to said moving means despite erosion of said edge.

8. Apparatus for recording signals on a web comprising a frame, means for feeding the web lengthwise, an elongate recording element movably mounted on the frame and having a recording edge for engaging one side of the web, a helical scanning element opposed to said elongate element, means on the frame for moving the scanning element effectively lengthwise of the elongate element to mark the web between said elements, said means including a drum having a recess extending around the drum and a strip of flexible material in the recess with a free portion hinged to the strip at a point spaced from said scanning element extending out of the recess for directly supporting the scanning element in helical form yieldingly to urge the scanning element against the web and press the web between said elements, a shoulder on the drum adjacent said recess and facing inwardly of the drum for opposing said free portion and limiting outward distension of the scanning element, and positioning means on the frame fixed relative to the axis of said drum for engaging the recording edge of said elongate element positively to space said edge relative to the outward limit of distension of said scanning element.

References Cited in the file of this patent

UNITED STATES PATENTS

| | | |
|---|---|---|
| 1,697,932 | Schnitzeler et al. | Jan. 8, 1929 |
| 2,380,467 | Ressler | July 31, 1945 |
| 2,413,962 | Finch | Jan. 7, 1947 |
| 2,415,229 | Young | Feb. 4, 1947 |
| 2,480,890 | Tribble | Sept. 6, 1949 |
| 2,515,864 | Finch et al. | July 18, 1950 |
| 2,568,754 | Lupish | Sept. 25, 1951 |
| 2,580,464 | Rohrberg | Jan. 1, 1952 |
| 2,623,116 | Rymes | Dec. 23, 1952 |